United States Patent
Kim et al.

[11] Patent Number: 5,952,230
[45] Date of Patent: Sep. 14, 1999

[54] MECHANICAL METHOD FOR SEPARATING SOYBEAN EMBRYOS IN HIGH PURITY

[75] Inventors: Beom-Hwan Kim, Suwon; Kil-Young Choi, Euiwang; Moo-Hoe Doh, Seoul, all of Rep. of Korea

[73] Assignee: Shin Dong Bang Corporation, Seoul, Rep. of Korea

[21] Appl. No.: 09/047,044

[22] Filed: Mar. 24, 1998

[30] Foreign Application Priority Data

Dec. 16, 1997 [KR] Rep. of Korea ............. P97-69326

[51] Int. Cl.⁶ .................. C12N 5/04; C12N 5/02; C12N 5/08; C12Q 1/02
[52] U.S. Cl. .................. 435/415; 435/29; 435/317.1; 435/426; 435/430.1
[58] Field of Search .................. 435/6, 29, 34, 435/410, 412, 420, 424, 430, 430.1, 317.1, 426, 415; 800/200, 235

[56] References Cited

U.S. PATENT DOCUMENTS 3,566,945  3/1971  Aoki et al. .................. 426/482
5,571,522  11/1996  Munson et al. .................. 424/410
5,609,880  3/1997  Munson et al. .................. 424/410

FOREIGN PATENT DOCUMENTS 59-82063   5/1984  Japan .
62-100256  5/1987  Japan .

*Primary Examiner*—Nancy Degen
*Attorney, Agent, or Firm*—Perman & Green, LLP

[57] ABSTRACT

A mechanical separation method for isolating soybean embryo in high purity or concentration from a soybean/embryo mixture produced by a conventional split/crush process and containing less than 2% by weight of embryos. The method comprises passing the mixture through a peeling process to separate it into a combination of split soybeans and a mixture of hulls and embryos containing about 20% by weight of embryos. The mixture is sifted to isolate a mixture of hulls and 30–70% by weight of embryos. Finally the mixture of hulls and embryos is separated by gravity force, such as in a cyclone device, to produce a hull/embryo mixture containing 90–97% by weight of embryos.

3 Claims, 1 Drawing Sheet

MECHANICAL METHOD FOR SEPARATING SOYBEAN EMBRYOS IN HIGH PURITY

BACKGROUND OF THE INVENTION

1. Field of the Invention

The present invention relates to a soybean embryo separation method, and more particularly to a mechanical method for the separation of soybean embryo which is regarded as a functional part of soybeans, from a combination of hull and embryo.

2. Description of the Prior Art

Studies about the abundant nutritional elements and cultivating method of soybeans have been actively conducted since about 1950 because soybean is regarded as a "miracle plant" and "beef out of field".

The main ingredients of soybeans consist of 40% of protein, 20% of fat, carbohydrate and the like, and particularly, soybeans are abundant in physiologically activating substances conducive to maintenance of homeostasis and biorhythm in the human body.

Recently, one of the physiologically activating substances, isoflavone is recognized to have a functional substance such that very many papers on isoflavone in soybeans have been published in the United States during recent years. Particularly, it is reported that a type of isoflavone, genistein, is effective in prevention of mammary cancer, osteoporosis and prostate cancer.

Soybean generally consists of 2% of embryo, 20% of endosperm and 8% of hull. The content of isoflavone in soybeans is approximately 0.2% and it is known that an embryo contains 2%, ten times the amount of isoflavone the endosperm contains.

In order to extract isoflavone, a method is required to extract only part of the embryo, and many technical methods are known relating to processes for separating the embryo from the soybean.

Japanese Patent publication No. 62-100256 discloses a method by which a crushed soybean embryo concentrate is reduced from high temperature and high pressure to low pressure to expand only the embryo to 1.5–5 times and to thereby separate same according to gravity.

Still another Japanese Patent publication No. Sho 59-82063 discloses a method, where soybeans are crushed by a pulverizer to eliminate bigger sizes of hull by an auxiliary peeling machine. The hull is then crushed by crusher to remove the smaller sizes of hull by way of a blower. The hull is now sifted and separated into halved soybeans and embryo.

However, there are problems with these Japanese embryo obtaining methods in that the amount of recovered embryo is low, nutrients in the embryo tend to be destroyed due to expansion of the embryo at high pressure, manufacturing cost can be high and moreover, purity of the embryo can be low.

SUMMARY OF THE INVENTION

The present invention relates to solving the aforementioned problems, and it is an object of the present invention to provide a mechanical method for separating soybean embryo in high purity, using a gravity or weight difference between the endosperm and the embryo to separate only the embryo from the soybean, thereby obtaining a high purity embryo.

It is another object of the present invention to obtain a high purity embryo without losing nutrients inherently contained therein.

It is still another object of the present invention to obtain a high concentration, isoflavon-rich and high value added soybean embryo product In accordance with the objects of the present invention, there is provided a mechanical separation method for isolating soybean embryo in high purity using the weight or gravity difference between an endosperm and an embryo to separate only the embryo from the soybean, thereby obtaining a high purity embryo, the method comprising the steps of:

separating in a peeling process a soybean embryo mixture (20% of embryos) using a mixture which has passed a general soybean split/crush process, into a hull mixture containing 10–20% of halved soybeans and embryos, and separating the same through a sifting process into a hull mixture including 30–70% of embryos; and finally separating the hull mixture thus processed, by means of gravity difference, into a hull mixture containing 90–97% of embryos.

BRIEF DESCRIPTION OF THE DRAWINGS

For a fuller understanding of the nature and objects of the invention, reference should be made to the following detailed description taken in association with the accompanying drawings in which.

DETAILED DESCRIPTION OF THE INVENTION

Figure 1:
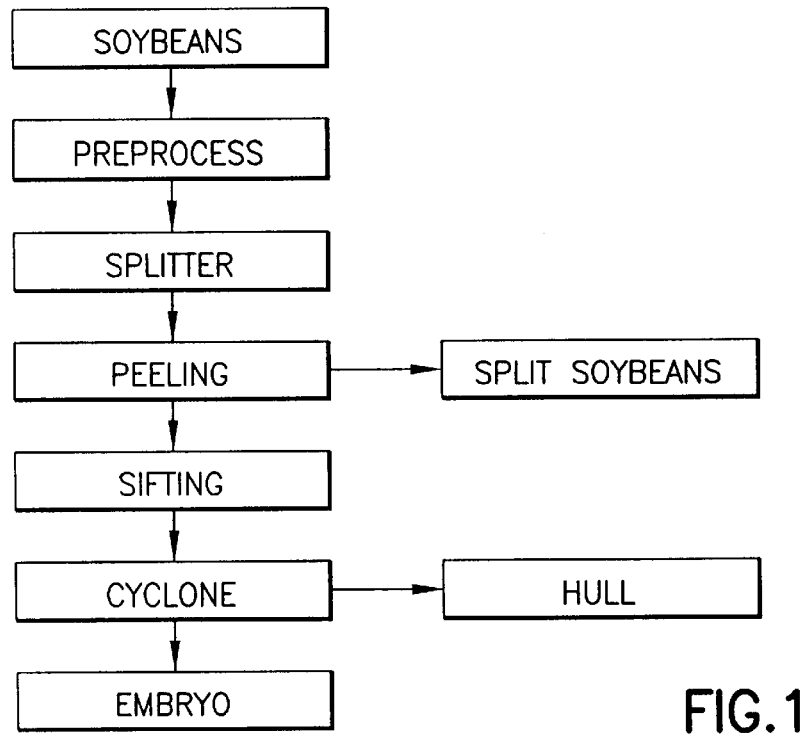
FIG. 1 is a block diagram showing separating process of embryos according to the present invention.
Figure 2:
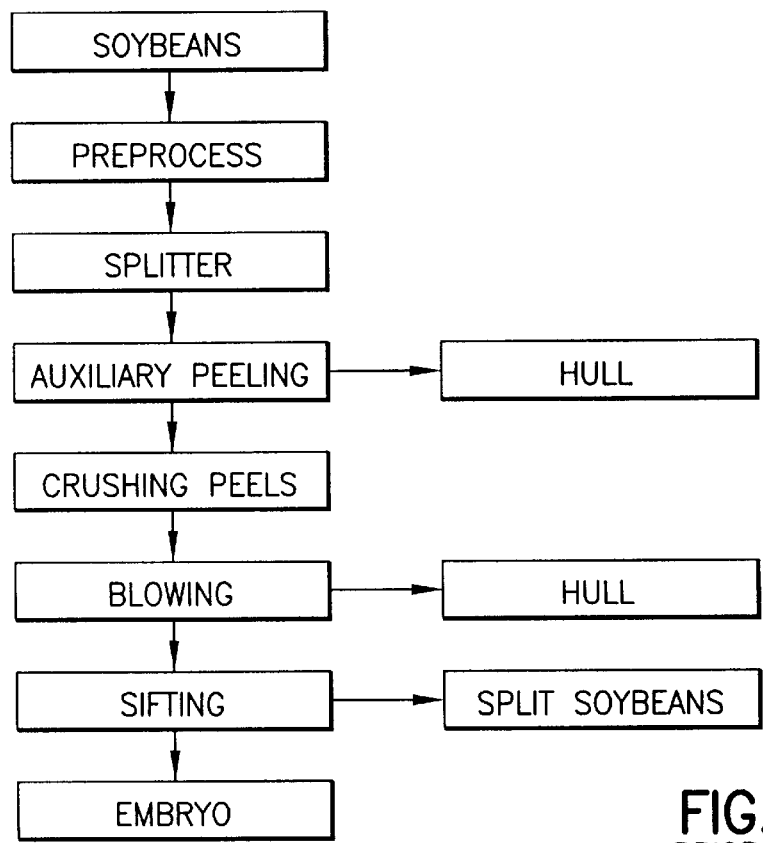
FIG. 2 is a block diagram showing separating method of embryos according to the prior art.

In order to accomplish the objects of the present invention, embryos are separated from the soybeans by means of a mechanical separation method using weight or gravity difference between embryo and endosperm, to produce high concentration embryos. A embryo separation method according to the present invention will now be described in detail.

In order to isolate soybean embryos in high purity, soybeans are carefully selected and contaminants are removed. The soybeans are heated to approximately 6–7% of moisture content and then are cooled. The soybeans are now split and crushed to produce a soybean mixture having an embryo content of less than 2%, which is used as basic material processed according to the present invention.

The aforementioned soybean mixture is passed through a peeling process and separated into split soybeans and a mixture of embryo and hull.

The split soybeans are subjected to a soybean processing procedure in which the mixture of hulls and embryo, containing 20% of embryos, is sifted and the formed mixture of hulls and embryo, containing 30–70% of embryos, is shifted to a gravity separation procedure.

Only the embryos are separated from the hulls when the mixture is separated by gravity difference, to produce embryos of over 90% purity.

Now, preferred embodiments according to the present invention will now be described in detail but it is apparent that the present invention is not limited thereto.

First Embodiment

In order to obtain high purity embryos, soybeans are carefully selected, heated and cooled and are then put through a split/crush process to produce a soybean/embryo mixture including less than 2% of embryos. 100 kgs of this mixture is used as basic material for the first embodiment.

The soybean/embryo combination including less than 2% of embryo, now passes through a peeling process to be separated into a combination of 89 kgs of split soybeans and 11 kgs of a mixture containing hulls and embryos (20% of embryos).

The separated split soybeans are subjected to a soybean process procedure, and the mixture of hulls and embryos, containing 20% of embryos, is sifted by a No. 10 coarse sifter and a No. 14 fine sifter. The mixture is again put into the No. 10 coarse sifter and the No. 14 fine sifter, to produce a mixture of hulls and embryos weighing 4.6 kgs retained on the No. 14 fine sifter.

The hull/embryo mixture is introduced to a cyclone to separate it into hulls and embryos and to obtain an embryo bulk of high purity (95%) weighing 1.5 kgs.

As apparent from the foregoing, there is an advantage in a mechanical method for separating soybean embryo in high purity according to the present invention, in that embryos can be separated at a higher acquisition rate or concentration compared with the conventional methods, a large quantity of soybean embryos can be separated at a time, and collateral installation costs can be reduced, thereby leading to a manufacturing cost reduction.

There is another advantage in that embryos are separated by a simple split/crush process and by a mechanical method using gravity difference, such that no destruction of functional nutrients in the embryos is produced, thereby enabling the retention of effective ingredients of the embryos.

What is claimed is:

1. A mechanical method for separating soybean embryos in high concentration from a split/crush soybean/embryo mixture containing less than about 2% by weight of embryos, under conditions which do not destroy functional nutrients of the embryos, comprising the steps of peeling the mixture to separate it into a combination of split soybeans and a mixture of hulls and embryos containing an increased content of embryos; sifting the mixture of hulls and embryos to isolate a mixture of hulls and embryos, containing between about 30% and 70% by weight of embryos, and separating said mixture by gravity force, due to the difference between the specific gravity of the hulls and the embryos, to produce a hull/embryo mixture containing between about 90% and 97% by weight of embryos.

2. A method according to claim 1 in which the produced embryos contain about 2% by weight of isoflavone.

3. A method according to claim 1 in which the mixture is separated by gravity force in a cyclone device.

* * * * *